United States Patent
Tipton et al.

(10) Patent No.: US 9,836,419 B2
(45) Date of Patent: Dec. 5, 2017

(54) EFFICIENT DATA MOVEMENT WITHIN FILE SYSTEM VOLUMES

(71) Applicant: Microsoft Technology Licensing, LLC, Redmond, WA (US)

(72) Inventors: William R. Tipton, Seattle, WA (US); Rajsekhar Das, Kirkland, WA (US); Surendra Verma, Bellevue, WA (US); Karan Mehra, Sammamish, WA (US); Cornel Emilian Rat, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 391 days.

(21) Appl. No.: 14/486,202

(22) Filed: Sep. 15, 2014

(65) Prior Publication Data

US 2016/0077988 A1 Mar. 17, 2016

(51) Int. Cl.
*G06F 13/36* (2006.01)
*G06F 13/28* (2006.01)
(Continued)

(52) U.S. Cl.
CPC ............ *G06F 13/28* (2013.01); *G06F 3/068* (2013.01); *G06F 3/0611* (2013.01);
(Continued)

(58) Field of Classification Search
CPC ........... G06F 17/30312; G06F 12/0835; G06F 17/30289
(Continued)

(56) References Cited

U.S. PATENT DOCUMENTS 8,645,662 B2 2/2014 Burton et al.
2004/0260900 A1* 12/2004 Burton .................. G06F 3/0608
711/162

(Continued)

FOREIGN PATENT DOCUMENTS

WO 2012160533 A1 11/2012

OTHER PUBLICATIONS

Feresten, et al., "Automated Storage Tiering and the NetApp Virtual Storage Tier", Retrieved on: Aug. 20, 2014 Available at http://www.netapp.com/us/communities/tech-ontap/tot-ast-virtual-storage-tier-1104.aspx.

(Continued)

*Primary Examiner* — Tim T Vo
*Assistant Examiner* — Kim T. Huynh
(74) *Attorney, Agent, or Firm* — Workman Nydegger (57) ABSTRACT

Embodiments are directed to efficiently managing data storage and efficiently storing data. In one scenario, a computer system receives a write request addressed to one portion of data storage within a data store. The computer system redirects the received write request to another portion of data storage which includes storage containers, each of which is a logically specified portion of the data store. The computer system determines which storage container the write request is to write to, and identifies a storage container that is to be de-staged from the second portion of data storage to the first portion of data storage. The computer system then de-stages the identified storage containers to the first portion of data storage, the data of the de-staged container being stored on the first portion of data storage in the same order in which the data was stored in the identified storage container prior to de-staging.

20 Claims, 6 Drawing Sheets

(51) Int. Cl.
*G06F 13/42* (2006.01)
*G06F 3/06* (2006.01)

(52) U.S. Cl.
CPC .......... *G06F 3/0635* (2013.01); *G06F 3/0647* (2013.01); *G06F 3/0649* (2013.01); *G06F 13/4221* (2013.01)

(58) Field of Classification Search
USPC .... 710/308, 100, 305, 36, 74; 711/260, 114, 711/162, 170
See application file for complete search history.

(56) References Cited

U.S. PATENT DOCUMENTS

| | | | |
|---|---|---|---|
| 2007/0179981 | A1 | 8/2007 | Vincent |
| 2008/0005475 | A1* | 1/2008 | Lubbers ............... G06F 3/0613 711/118 |
| 2009/0089524 | A1 | 4/2009 | Fujihara et al. |
| 2010/0082537 | A1 | 4/2010 | Lasser |
| 2011/0258378 | A1 | 10/2011 | Ananthanarayanan et al. |
| 2013/0054927 | A1* | 2/2013 | Raj ....................... G06F 3/0608 711/170 |
| 2013/0275653 | A1 | 10/2013 | Ranade et al. |
| 2015/0193170 | A1* | 7/2015 | Sundaram ............ G06F 3/0641 711/103 |

OTHER PUBLICATIONS

Chadha, et al., "ROW-FS: a user-level virtualized redirect-on-write distributed file system for wide area applications", In Proceedings of the 14th International Conference on High Performance Computing, Dec. 18, 2007, 2 pages.

Chadha, et al., "Provisioning of Virtual Environments forWide Area Desktop Grids through Redirect-on-write Distributed File System", In Proceedings of IEEE International Symposium on Parallel and Distributed Processing, Apr. 14, 2008, 8 pages.

Harker, et al., "Dynamic Storage Tiering", In White Paper of Hitachi, Sep. 2010, 17 pages.

"What's New in Storage Spaces in Windows Server", Published on: Sep. 11, 2013 Available at: http://technet.microsoft.com/en-us/library/dn387076.aspx.

Warden, Tim, "Storage Virtualization", In White Paper, Retrieved on: Aug. 20, 2014, 6 pages.

"Second Written Opinion Issued in PCT Application No. PCT/US2015/049874", dated Jul. 27, 2016, 10 Pages.

"International Search Report and Written Opinion Issued in PCT Application No. PCT/US2015/049874", dated Mar. 22, 2016, 19 pages.

"Block (data storage)", Retrieved from <<https://en.wikipedia.org/wiki/Block_(data_storage)>>, Sep. 3, 2014, 1 Page.

"International Preliminary Report on Patentability Issued in PCT Application No. PCT/US2015/049874", dated Dec. 1, 2016, 6 Pages.

* cited by examiner

EFFICIENT DATA MOVEMENT WITHIN FILE SYSTEM VOLUMES

BACKGROUND

Computing systems have become ubiquitous, ranging from small embedded devices to phones and tablets to PCs and backend servers. Each of these computing systems includes some type of data storage and typically, many different types of data storage. For example, a computing system may include solid-state storage and a hard drive or set of hard drives. The solid-state storage may be able to handle read and write I/O requests more quickly than the hard drive, but may not have the storage capacity of the hard drive. Other media such as tape drives, DVDs (or other optical media) or other kinds of media may have different advantages and disadvantages when reading, writing and storing data.

BRIEF SUMMARY

Embodiments described herein are directed to efficiently managing data storage and to efficiently storing data. In one embodiment, a computer system receives a write request addressed to one portion of data storage within a data store. The computer system redirects the received write request to another portion of data storage within the data store. This second portion of data storage includes storage containers, each of which is a logically specified portion of the data store. The computer system determines which storage container the received write request is to write to on the second portion of data storage, and identifies a storage container that is to be de-staged from the second portion of data storage to the first portion of data storage. The computer system then de-stages the identified storage containers to the first portion of data storage, the data of the de-staged container being stored on the first portion of data storage in the same order in which the data was stored in the identified storage container prior to the de-staging.

In another embodiment, a computer system accesses use information for a set of storage containers, where each storage container is a logical portion of a data store. The computer system determines that data stored in at least one of the storage containers includes data that has specified characteristics that meet certain criteria. Based on these criteria, the computer system determines which operations are to be performed on the data associated with the container, and performs those operations on the data of the container. Such operations may include identifying frequently-used or infrequently-used data and moving it to lower-speed, higher-capacity storage, compressing data, or other operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to efficiently managing data storage and to efficiently storing data. In one embodiment, a computer system receives a write request addressed to one portion of data storage within a data store. The computer system redirects the received write request to another portion of data storage within the data store. This second portion of data storage includes storage containers, each of which is a logically specified portion of the data store. The computer system determines which storage container the received write request is to write to on the second portion of data storage, and identifies a storage container that is to be de-staged from the second portion of data storage to the first portion of data storage. The computer system then de-stages the identified storage containers to the first portion of data storage, the data of the de-staged container being stored on the first portion of data storage in the same order in which the data was stored in the identified storage container prior to the de-staging.

In another embodiment, a computer system accesses use information for a set of storage containers, where each storage container is a logical portion of a data store. The computer system determines that data stored in at least one of the storage containers includes data that has specified characteristics that meet certain criteria. Based on these criteria, the computer system determines which operations are to be performed on the data associated with the container, and performs those operations on the data of the container. Such operations may include identifying frequently-used or infrequently-used data and moving it to lower-speed, higher-capacity storage, compressing data, or other operations.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
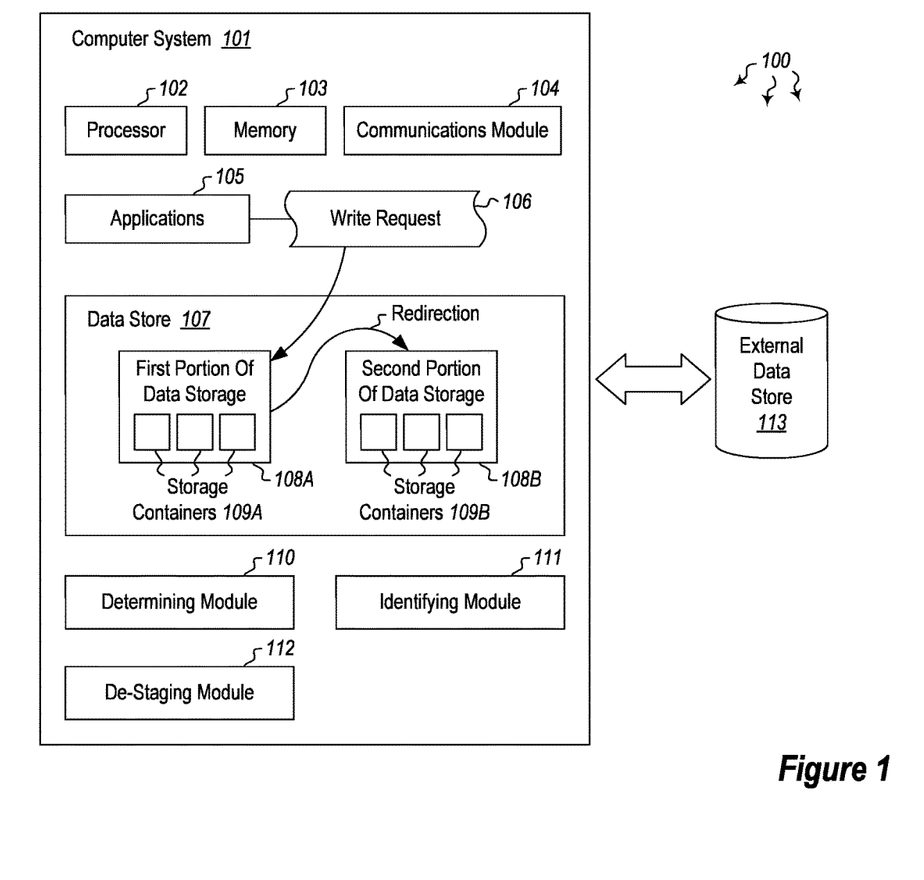
FIG. 1 illustrates a computer architecture in which embodiments described herein may operate including efficiently managing data storage and efficiently storing data.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 further includes applications 105. These may be any type of software application, service or other portion of software code functionality. The applications 105 may send read and/or write requests 106 to a data store. Additionally or alternatively, it should be noted, the read/write input/output (I/O) requests may come from another computing system or another application outside of computer system 101. The data store to which the I/O requests are sent may comprise any amount of data from any of a variety of different data types. Indeed, the data store 107 may include a first portion of data storage 108A and a second portion of data storage 108B, but may include substantially any number or types of data stores. The data stores may be individual storage devices such as hard drives, solid-state drives (such as flash drives), optical drives (such as DVDs or Blue-Ray discs), hybrid drives or other data storage devices. The portions of data storage may also include temporary storage such as random access memory (RAM), physical caches (such as processor caches), or any other type of data store that can temporarily or permanently store data.

The data store 107 may be addressed by applications as a single data store, even though the data store itself includes different logical portions and/or different physical portions. For example, in some cases, the data store 107 may be an array of hard drives, where the first and second data storage portions 108A and 108B are different logical portions of the hard drive (disk) array, where the logical portions may span multiple physical drives, or may be different logical portions of the same drive. In other cases, the first portion of data storage 108A may be a certain type of data storage (e.g. solid-state drives (SSDs)) and the second portion of data storage 108B may be hard drives (or hard disk drives (HDDs)). Many other embodiments are thus possible and, as such, embodiments describing the first portion of data storage 108A as SSD and the second portion of data storage 108B as a hard drive are merely examples, and should not be read as limiting the types of storage, the number of storage portions or other characteristics of the general data store 107 as described above.

Each portion of data storage may include storage containers 109A/109B. The storage containers may be logical or physical divisions of the data store, and each portion of data storage may include substantially any number of storage containers. These storage containers may be the same size or different sizes, and the sizing for each container may change. Storage containers may be moved between data storage portions and even between data stores, as will be described further below.

Embodiments herein may be implemented to manage storage hardware such as flash and HDD as a single memory hierarchy. Such embodiments may produce storage that has greater capacity than flash with better performance than HDD. Embodiments may describe methods or systems in which writes are committed durably with low latency, writes have minimal interference with random reads, both data and metadata are efficiently moved to cold storage, support is provided for parity as a near-line HDD configuration, and data checksums are configurable on a per-file basis. Such a system may implement many different data storage portions, as outlined above. Random I/O requests such as writes may be redirected into a first portion of data storage (e.g. 108A). This portion of data storage may be the fastest tier for processing random data writes. Examples of such data storage hardware may include flash or a non-volatile dual in-line memory module (NVDIMM). The system may de-stage the incoming writes in batches to the HDD tier (e.g. 108B) using sequential writes. Sequential writes allow optimization of parity writes in parity resilience implementations.

In some embodiments, random writes are sent to flash memory and then de-staged to HDDs. Because hard drives excel at sequential IO, and because flash memory can perform random I/O very quickly, I/O throughput may be increased. As random writes are redirected to flash (or some other type of data storage), sequential segments of data are set up for de-staging onto hard drives, tape, optical or other data storage.

In write-back caching and similar caching methods, the data is rearranged in a faster tier so that it can be de-staged as one contiguous unit in the higher capacity tier. The rearrangement into sequential patterns retains the rearrangement even in the high capacity tier. Traditional write-back cache approaches would put the cached writes "back to where they belong," which is why they eventually become throttled on the cost of random writes in the tier they are de-staging into.

In the embodiments herein, the cached write segments are de-staged in their entirety. One benefit to this approach is that it allows data writes to be performed at nearly the same speed as the high-capacity storage tier can write sequentially to the final storage tier. Data, however, if fragmented in the fast tier, will remain in a fragmented state in the high-capacity tier. A staging area may be implemented to (1) ensure that data writes that are redirected to flash are committed durably in the staging area so that they can be assembled into sequential streams for de-stage and acknowledged with low latency. The staging area may also (2) collect writes over some period of time in order to absorb overwrites of blocks, dampening the throughput requirement of de-stage, and further (3) absorb bursts of writes (e.g. workloads where the write load is inconsistent).

For (1), the staging area is implemented to durably assemble blocks so that they can be de-staged sequentially. The staging area does not need extra visibility into the I/O pattern to optimize de-stage because de-stage for forward progress is at a minimum completely predictable. The portion of flash or other memory required is a function of the number of HDDs, the redundancy scheme, and the sequential write throughput of those HDDs. It is not primarily a function of the size of the HDD tier. In one embodiment, for a target of 600 8 KB write IOPS per disk, a configuration with 200 disks might implement a minimum of 1 GB of write stage flash in order to accomplish (1). Much of the remaining flash (or other fast-tier storage) could be dedicated to a read cache. It may be desirable, at least in some instances, to have more space dedicated to write staging than (1) strictly requires. Embodiments may be designed to not de-stage faster than the speed at which the system can continue to maintain a certain number of input/output operations per second (IOPS) and latency targets. Having extra storage containers (e.g. 109A/109B) may allow for more intelligent de-staging and the opportunity to handle temporally non-uniform write workloads.

The system may be configured to throttle small random writes so that it does not need to speed up the de-stage rate in order to satisfy incoming writes. The size of the de-stage area, in terms of (1) above, will determine the floor for the throttle; (2) and (3) may use any extra write stage provisioning to improve beyond that floor. As such, the system may interpret the expected ideal write workload for a volume and then limit its write de-stage to consume no more than that amount at any given time.

Storage containers, as mentioned above, are logical divisions of a storage volume. The storage containers may be ranges of a given volume on the order of 64 MB (or some other size of unit). Containers may, but are not required to, all have the same size, and container size may be fixed, configurable, or dynamically variable. Containers do not overlap and, as such, a given block is present within exactly one container at a time. File extent tables track the logical block addressing (LBA) at which logical file extents start. In embodiments herein, these tables may be modified to record the identity (ID) of the container and the offset within that container where the extent begins. In order to perform I/O on a block, the system looks up the location of the extent's storage container to find the real location. This is a level of indirection that allows the system to move the location of containers without consulting or modifying file extent tables. In this manner, containers may include entire files or pieces of many different files. At least in some embodiments, the container ID and offset may be encoded in such a way that the size of the container ID and offset pair is the same as the size of a block offset. The encoding may ensure that two different containers do not collate together—that is, there is separation in the address space between containers.

Metadata about storage containers may be tracked in a single index per volume, where the key is the container ID and the value is information about the container including, but not limited to, the following: the container's current physical location, whether it is permissible to move that container, and the last time the container was written to. Embodiments may redirect data writes as needed to containers in the flash tier. As flash containers fill, the containers are moved from flash to HDD (or some other high-capacity storage). Containers from the HDD may then be selected and moved into flash to fill with subsequent writes.

When a write request is made on a file, the system may perform the following: 1) Check the present location of that file block. If it is backed by flash, the system will allow the write to proceed. 2) If the allocation for that file extent is on HDD or is partially on HDD, the portion of it that is on HDD will be reallocated to flash. 3) The portion of flash selected for the file will be within one of the relatively small number of containers used for write redirection. 4) The system will allow the write to proceed to the reallocated space. 5) The system will generate a log record to keep track of the fact that the file extent has been relocated. 6) If the write request is write-through (as is the case in some data shares), the system will write the redo log record and wait for its acknowledgement from storage before acknowledging the request. It should be noted that checksum generation—integrity streams—are not mentioned in the above steps. Whether or not a stream has checksums for its data is unrelated to whether a segment of the file is reallocated to keep the system running efficiently.

As writes are received and acknowledged by the system, the flash (or other fast-tier storage) containers begin to fill up. At this point, the system may select a storage container used for writes from the flash tier to de-stage into the HDD tier. The system may synchronize with concurrent IO requests to that container. Overwrites to that container are no longer allowed to proceed and are to reallocate to a different flash container. Reads may continue, but will be made impermissible after the movement is finished. The system reads the container's contents and selects a position on the HDD tier to de-stage the container into. The system writes the container (e.g. in a large, sequential write) into the HDD. The system updates the container table to indicate the container has moved and writes a redo log record stating this. The system finishes the synchronization with the concurrent I/O requests to the container's original location. Data reads are then drained and redirected to the new location.

The system views some small portion of the fast tier as containers that it is filling with the intent of de-staging the containers to the HDD tier. In a continuous write workload, the system is continually moving containers from flash into HDD. As the disk fills and/or becomes fragmented, fewer available storage containers are present on the high-capacity tier. At this point, the system can either read and rewrite fragmented segments in the high-capacity (e.g. HDD) tier in order to compact/clean them, or the system can rotate a container from HDD to flash and thread the new writes into the free space within that container. Both approaches implement reads and writes. Threading new writes into existing containers keeps the write workload predictable: the write path is never blocked on compaction/cleaning. Threading new writes does introduce the possibility of inadvertently mixing hot (newly written) and cold (written long ago, still allocated) data. Some form of on-demand cleaning/defragmentation may be implemented to help compensate. These concepts will be explained further below with regard to methods 200 and 300 of FIGS. 2 and 3, respectively.

Figure 2:
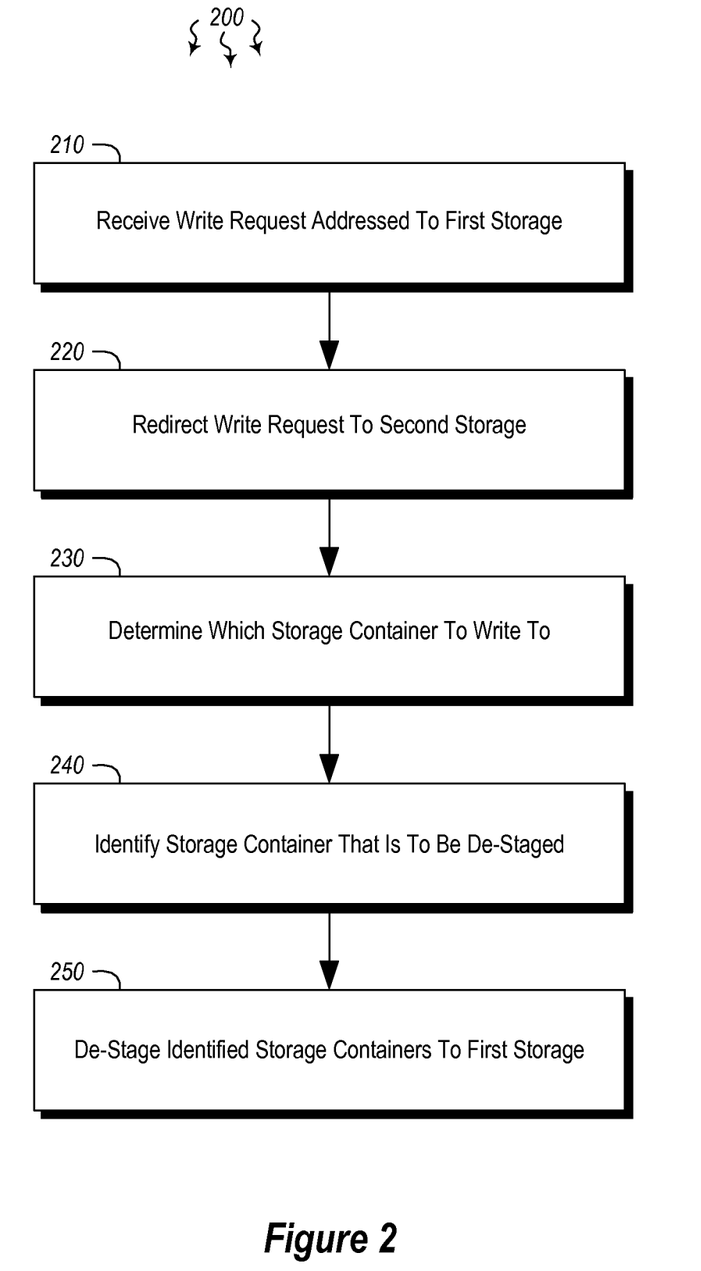
FIG. 2 illustrates a flowchart of an example method for efficiently managing data storage.
Figure 3:
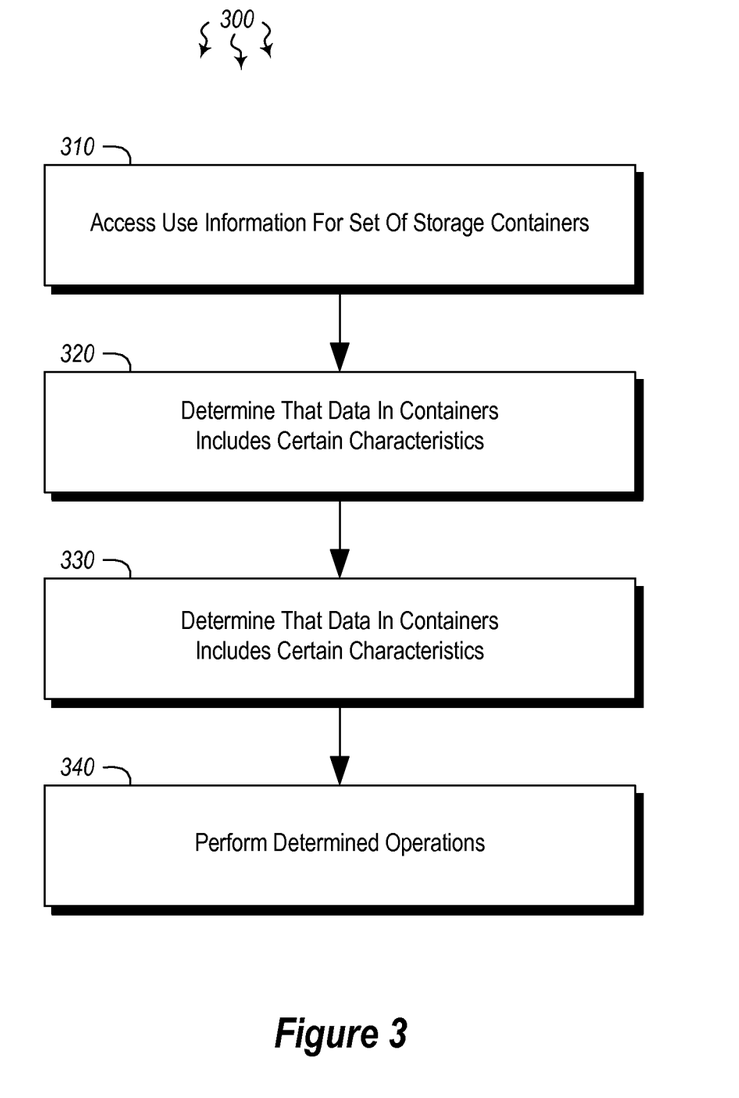
FIG. 3 illustrates a flowchart of an example method for efficiently storing data.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for efficiently managing data storage. The method 200 will now be described with frequent reference to the components and data of environment 100.

Method 200 includes receiving a write request addressed to a first portion of data storage within a data store (210). For example, data store 107 may receive write request 106 from one or more of the applications 105 running on the computer system 101. The data store 107 may include multiple different logical or physical storage areas 108A/108B, each of which includes logical or physical divisions referred to as storage containers 109A/109B. The data store 107 may appear as a single data store to applications 105 running on the computer system, but may include multiple different storage types including NVRAM, SSD, HDD, Cloud, tape, DVD, Blue Ray or other types of storage, storage arrays or storage networks. It should be noted that while the data store 107 is depicted as being part of computer system 101, the data store may be external to computer system 101, or may include some storage components that are internal and some that are external.

Method 200 next includes redirecting the received write request to a second portion data storage within the data store, the second portion of data storage including one or more storage containers, each storage container comprising a logically specified portion of the data store (220). The received write request 106 may be directed to the data store 107 generally, or may be directed to a certain portion of the data store. For example, the write request may be directed to a first portion of data storage 108A, and then may be redirected to a second portion of data storage 108B. Each portion of data storage may include storage containers 109A/109B, which themselves are logically defined sequential streams of bytes.

In some embodiments, the second portion of data storage 108B within the data store is faster at performing input/output (I/O) operations than the first portion of data storage 108A. In such embodiments, the first portion of data storage may be a high-capacity storage such as a hard drive, optical disk or tape drive, while the second portion of data storage may be a fast-tier storage such as SSD or cache memory. As such, in this embodiment, write requests sent to (or merely received at) the first (high-capacity) portion of data storage 108A are redirected to the second, fast-tier portion of data storage 108B. In this manner, data writes may be performed on storage hardware that is more capable of and more customized for quickly writing data. This may reduce bottlenecks that may occur on storage hardware that is not as quick at writing data (e.g. high-capacity storage devices).

Method 200 further includes determining which storage container the received write request is to write to on the second portion of data storage (230) and identifying at least one storage container that is to be de-staged from the second portion of data storage to the first portion of data storage (240). The storage container may include multiple data file portions corresponding to multiple different data files. Thus, for instance, a given storage container 109B in the second portion of data storage 108B may include various whole files and various portions of files (i.e. partial files). Then, if a container is moved, only the metadata for that container (e.g. identifying the container's size, its identity, and where it's located) would need to be updated. File metadata would not need to be updated.

Identifying a storage container that is to be de-staged may be performed in a variety of manners. Upon determining (by the determining module 110) which storage container 109B a write request 106 is to be written to, the identifying module 111 of computer system 101 may identify which container was least recently written to. Then, whichever storage container was least recently written to is selected as the container that is to be de-staged and moved to the first (e.g. high-capacity) storage 108A. In this manner, containers on the fast-tier storage that have "cold" data (i.e. data that has not changed for a certain period of time) are moved to high-capacity storage to make room on the fast-tier storage for "hot" data (i.e. data that changes frequently). In another example, identifying a storage container to de-stage from the second portion of data storage to the first portion of data storage may include determining which container is closest to being full of data. Thus, the identifying module 111 may find those containers that are full of data and tag those containers as being ready for de-staging to the lower-tier, higher-capacity storage.

Still further, in another example, identifying a storage container that is to be de-staged from the fast-tier data storage to the high-capacity data storage may include accessing a hint indicating which storage containers will not be used for a specified amount of time. For instance, a user or an application (e.g. 105) may provide a hint indicating that a specific container or set of containers will not be used for a specified amount of time. The identifying module 111 may access and interpret this hint and tag those containers that will not be used as being ready for de-staging to the high-capacity storage. The hint may further specify that a container or file is read only and, as such, the container or file can be read or deleted, but not overwritten. It should be understood that while some methods of identifying storage containers that are available for de-staging have been described above, many other algorithms and methods may be used alone, or in combination with other methods or algorithms, to determine which storage containers are to be de-staged and when they are to be de-staged. For example, some embodiments may identify containers that are not full yet, but are filling up quickly as ready for de-staging, or may give hinted containers de-staging priority over other algorithms such as being full or including cold data.

Method 200 also includes de-staging the identified storage containers to the first portion of data storage, wherein the data of the de-staged container is stored on the first portion of data storage in the same order in which the data was stored in the identified storage container prior to the de-staging (250). For example, de-staging module 112 may de-stage or move those storage containers 109B identified by the identifying module 111 as being ready for de-staging. The data in the de-staged container may be moved from one portion of data storage (e.g. 108B) to another portion of data storage (e.g. 108A) as the container is moved.

Figure 5:
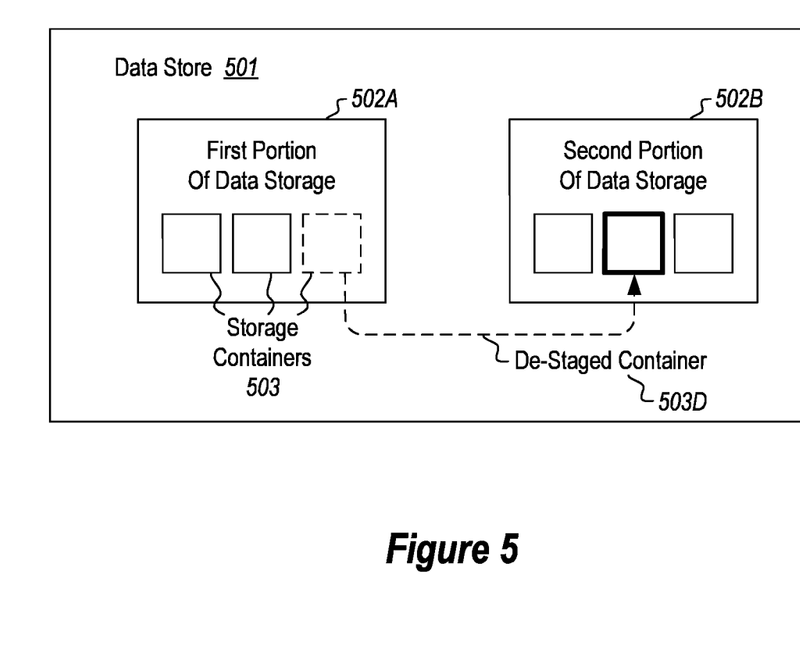
FIG. 5 illustrates an embodiment in which a storage container in one data store is moved to another data store.

For instance, as shown in FIG. 5, the data store 501 may include two data storage portions 502A and 502B. While the first portion of data storage 502A includes multiple storage containers 503, one of these containers 503D may be de-staged (e.g. by module 112 of FIG. 1) and moved to the second portion of data storage 502B. The container includes any data files that were stored inside it. These data files may be sequential and aligned spatially, or may be fragmented and out of spatial alignment. When the container is de-staged from the first data storage 502A to the second data storage 502B, the data files and file portions are moved together in the form they are currently stored in. Thus, the data within a container is moved together, fragmented or sequential, and is not realigned upon re-staging in its new location. Accordingly, the data of the de-staged container is stored on the second data storage 502B, for example, in the same order in which the data was stored in first data storage 502A prior to de-staging.

When the data of the de-staged container is written to the second portion of data storage, the data may be written sequentially to the storage device. This may have significant benefits when writing to high-capacity storage devices or media such as HDDs, tape drives or optical discs. Such high-capacity storage devices may be optimized for sequential data storage. For example, in one case, a storage container may be de-staged to a sequentially-constrained media such as a shingled-magnetic recording (SMR). Other types of storage media and devices such as hard drives and DVDs also write data more efficiently when it is written sequentially on the high-capacity media.

Once a container has been de-staged, a storage container mapping table may be updated that indicates an identity and location for each container in the data store. Because the storage container mapping table stores the identify and location of each container in the data store 501, the de-staging module 112 of FIG. 1 does not need to open files or open file locations when moving the container. Rather, the de-staging module 112 can just identify the location of the container and move it, without modifying file metadata. Once the container has been moved, the container metadata is updated in the storage container mapping table. This is true even for cases where the data store 501 is a volume of a file system or is otherwise tied to file system.

Figure 6:
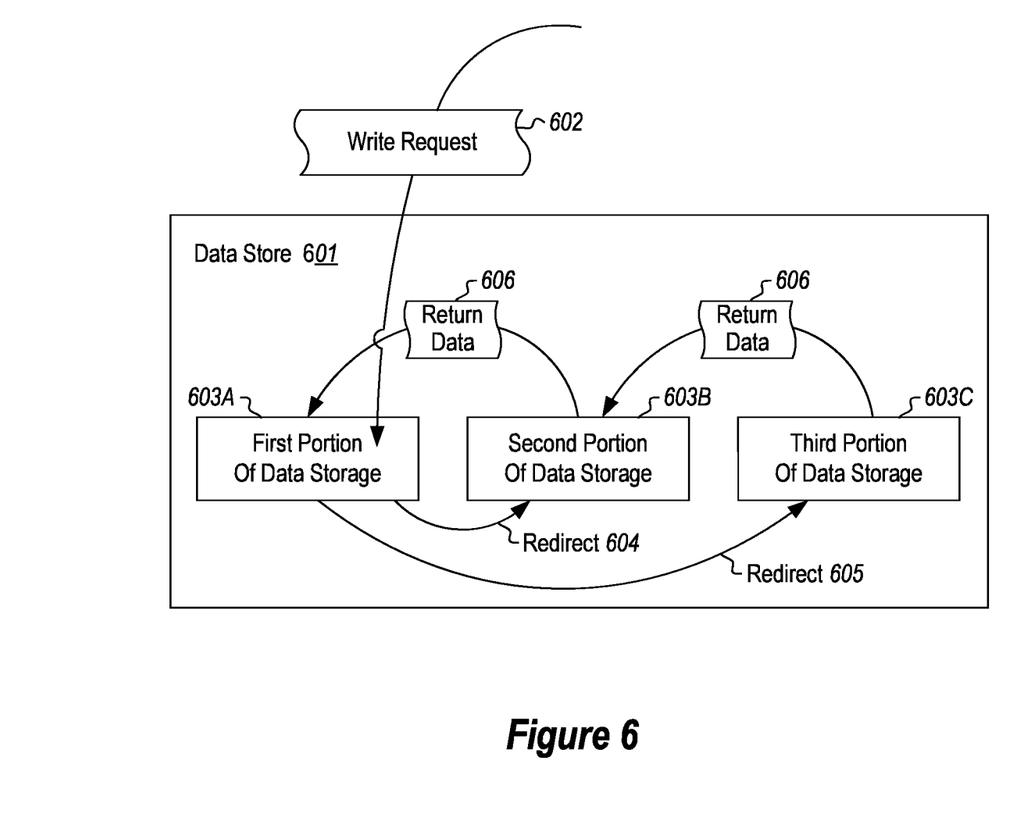
FIG. 6 illustrates an embodiment in which data I/O requests are redirected to different parts of a data store, and where data is returned from some parts of a data store to other parts.

In some embodiments, as shown in FIG. 6, storage containers may be de-staged from the first portion of data storage to other portions of data storage such as the third portion of data storage 603C within data store 601. In data store 601, the first portion of data storage 603A may be the slowest at random writes, and so may redirect write requests 602 to either the second portion of data storage 603B (in redirect 604) or to the third portion of data storage 603C (in redirect 605). The second data storage 603B may be faster than the first, but slower than the third, and the third may be the fastest at writing data. After the second and third data storage portions have handled the write requests, various containers on those storage portions may be de-staged and returned to the first portion of data storage 603A in return data 606. If writes target data that is already in the fastest portion of the storage system, the system may perform the writes at that portion of data storage (and potentially in the same container) and not redirect the write request 602.

Data writes may thus be handled by the storage portion they are addressed to, they may be redirected, or if they are addressed to no specific data portion, may be handled by the fastest available storage portion. In one example, ten write requests may come in and could go to ten different containers, or to the same container. If ten writes came in for the same file, they may go to the same container or to multiple containers. If data is hot, it may be moved to fast-tier storage or, if that data subsequently becomes cold, it may be moved to a lower-tier storage. The de-stage step can target a portion of data storage different from the original request target. For example, if a hard drive container was the initial target of a write request, the initially targeted HDD container may be relocated directly to SSD, bypassing any intermediary storage types such as cloud or tape.

Returning to FIG. 1, in some embodiments, a resiliency implementation (such as mirror or parity) may be implemented in the first portion of data storage 108A and a second, different resiliency implementation is implemented in the second portion of data storage 108B within the data store 107. The data write would be written across multiple HDDs, with part of the file on one drive, and part of the file on another drive. The data could then be read back, parity could be calculated, and data could be written to a faster tier of data storage.

Turning now to FIG. 3, a flowchart is illustrated of a method 300 for efficiently storing data. The method 300 will now be described with frequent reference to the components and data of environment 400 of FIG. 4.

Figure 4:
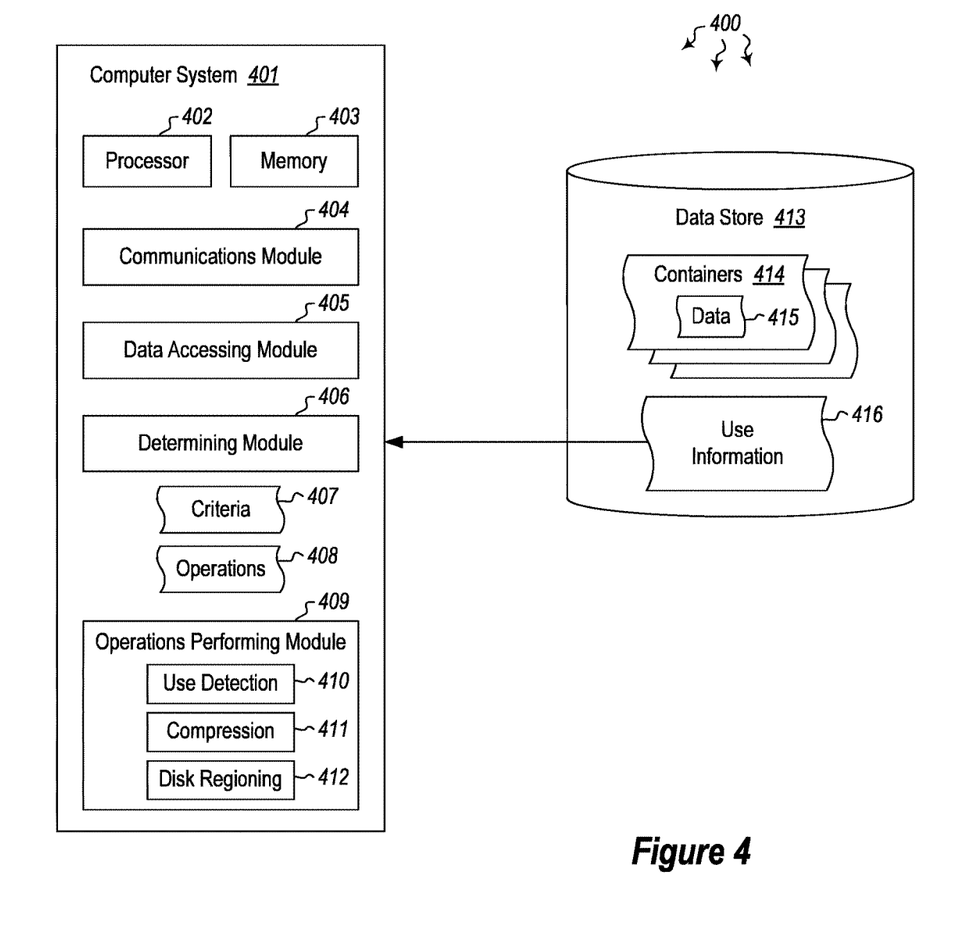
FIG. 4 illustrates a computer architecture in which embodiments described herein may operate including efficiently storing data.

Method 300 includes accessing one or more portions of use information for a set of storage containers, the storage containers comprising logical portions of a data store; (310). For example, data accessing module 405 of computer system 401 may access use information 416 for storage containers 414 stored in data store 413. The computer system 401 may include at least one hardware processor 402 (or processing core), along with memory 403 and a communications module 404 for communicating with other computing systems. The use information 416 accessed by the data accessing module of computer system 401 may include a de-stage history for the set of storage containers. The de-stage history may indicate which storage containers were moved, where they were moved and when they were moved.

Method 300 includes determining that data stored in at least one of the storage containers includes data that has specified characteristics that meet one or more criteria (320). The determining module 406 of computer system 401 may determine that data 415 stored in the storage containers 414 has certain characteristics that meet certain criteria 407. The criteria may include, for example, an indication that the data has not been accessed for at least a threshold amount of time. Such data may be said to be cold data. In cases where the data storage portion is a hard drive, and when the data has not been accessed for at least the threshold amount of time, that data is written to the end of the hard drive in a sequential manner. The end of the hard drive may be the interior of the spinning plates and may be the least accessible portion of the hard drive (i.e. the portion that takes the longest amount of time to access). The coldest data may thus be placed on the innermost portions of the hard drive. In some cases, containers may include unmovable data (such as global metadata). In those cases, the containers are not de-staged.

Based on the criteria 407, the determining module 406 determines which operations 408 are to be performed on the data 415 associated with the container (330). The operations performing module 409 then performs those operations on the data of the container (340). In one example, the operation to be performed on the data 415 associated with the container 414 includes rotating at least one of the containers from a first portion of data storage to a second portion of data storage. Over time, as data is deleted, moved or otherwise changed, holes may appear in the storage containers. By rotating the containers, holes may be refilled in the various portions of data storage. Operations may include moving the data of a container to a specified portion of the data store (e.g. to the inside of a hard drive for cold data, or to the outside of the hard drive for hot data). This is referred to as disk regioning 412. Other operations include compressing the data 411 of one container into a smaller-sized container. Once the containers have been compressed into new, smaller-sized containers, the old containers may be released.

In some embodiments, hidden containers may be reserved on a portion of data storage for repositioning containers. These hidden containers provide extra space for repositioning containers. In this manner, new containers may be brought in, filled and de-staged to slower data storage. The de-staging of storage containers as well as the compression of storage containers may be based on data use, as determined in 410 by operations module 409. In this manner, many different operations may be performed on data based on various characteristics related to that data such as use information 416. Once it has been determined that an operation is to be performed (such as moving the data from a faster storage to a slower storage), the operations performing module 409 may perform the operation. Accordingly, faster portions of data storage may be used to temporarily absorb higher throughput operations (such as random writes) and the data may be de-staged to slower portions of data storage at a later time.

Accordingly, methods, systems and computer program products are provided which efficiently manage data storage. Moreover, methods, systems and computer program products are provided which efficiently store data in a data store.

Embodiments may include a computer system including at least one processor that performs a computer-implemented method for efficiently managing data storage, where the method includes receiving a write request 106 addressed to a first portion of data storage 108A within a data store 107, redirecting the received write request 106 to a second portion of data storage 108B within the data store, the second portion of data storage including one or more storage containers 109B, each storage container comprising a logically specified portion of the data store 107, determining which storage container the received write request 106 is to write to on the second portion of data storage 108B, identifying a storage container 109B that is to be de-staged from the second portion of data storage 108B to the first portion of data storage 108A, and de-staging the identified storage container to the first portion of data storage 108A, wherein the data of the de-staged container is stored on the first portion of data storage in the same order in which the data was stored in the identified storage container prior to the de-staging.

In some embodiments, the second portion of data storage within the data store is faster at performing random input/output (I/O) operations than the first portion of data storage. In some embodiments, the data store further comprises a third portion of data storage, the third portion of data storage being faster at I/O operations than the first portion of data storage, but slower at I/O operations than the second portion of data storage. In some embodiments, the identified storage container is de-staged from the first portion of data storage to the third portion of data storage, and subsequently de-staged from the third portion of data storage to the second portion of data storage.

A computer-implemented method for efficiently storing data is provided, where the method includes accessing one or more portions of use information 416 for a set of storage containers 414, the storage containers comprising logical portions of a data store 413, determining that data 415 stored in at least one of the storage containers includes data that has specified characteristics that meet one or more criteria 407, based on the one or more criteria, determining which operations 408 are to be performed on the data associated with the container; and performing those operations 408 on the data of the container.

In some embodiments, at least one of the criteria for the data comprises an indication that the data has not been accessed for at least a threshold amount of time, and the operation to be performed on the data comprises moving the data of the container to a specified portion of the data store. In some embodiments, the data store comprises a hard drive, and the data that has not been accessed for at least the threshold amount of time is written to the end of the hard drive. In some embodiments, the operation to be performed on the data associated with the container comprises rotating at least one of the containers from a first portion of data storage to a second portion of data storage, such that holes in the containers are refilled on the first portion of data storage.

A computer system is provided including the following: one or more processors; a receiver 104 for receiving a write request 106 addressed to a first portion of data storage 108A within a data store 107, a redirecting module for redirecting the received write request 106 to a second portion data storage 108B within the data store, the second portion of data storage including one or more storage containers 109B, each storage container comprising a logically specified portion of the data store 107, a determining module 110 for determining which storage container the received write request 106 is to write to on the second portion of data storage 108B, an identifying module 111 for identifying at least one storage container that is to be de-staged from the second portion of data storage 108B to the first portion of data storage 108A, and a de-staging module 112 for de-staging the identified storage containers to the first portion of data storage 108A, wherein the data of the de-staged container is stored sequentially on the first portion of data storage.

In some embodiments, identifying at least one storage container that is to be de-staged from the second portion of data storage to the first portion of data storage comprises accessing a hint indicating which storage containers will not be used for a specified amount of time. In some embodiments, the at least one storage container includes a plurality of data file portions corresponding to a plurality of different data files. Some embodiments further include updating a container mapping table that indicates an identity and location for each container in the data store. In some embodiments, a first resiliency implementation is implemented in the first portion of data storage and a second, different resiliency implementation is implemented in the second portion of data storage within the data store. In some embodiments, identifying the storage container that is to be de-staged from the second portion of data storage to the first portion of data storage comprises determining which container was least recently written to. In some embodiments, identifying the storage container that is to be de-staged from the second portion of data storage to the first portion of data storage comprises determining which container is full of data, such that the full container is de-staged from the second portion of data storage and moved to the first portion of data storage.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor, a computer-implemented method for efficiently managing data storage, the method comprising:
   receiving a write request addressed to a first data storage device within a data store system that presents a plurality of data storage devices as a single logical data store;
   redirecting the received write request to a second data storage device within the data store system, the second data storage device including one or more storage containers, each storage container comprising a logically specified portion of the data store system;
   determining which storage container the received write request is to write to on the second data storage device;
   identifying a storage container that is to be de-staged from the second data storage device to the first data storage device; and
   de-staging the identified storage container to the first data storage device, wherein the data of the de-staged container is stored on the first data storage device in the same order in which the data was stored in the identified storage container prior to the de-staging.

2. The method of claim 1, further comprising updating a container mapping table that indicates an identity and location for each container in the data store system.

3. The method of claim 1, wherein the at least one storage container includes a plurality of data file portions corresponding to a plurality of different data files.

4. The method of claim 1, wherein the second data storage device within the data store system is faster at performing random input/output (I/O) operations than the first data storage device.

5. The method of claim 4, wherein the first data storage device comprises a hard drive and wherein the second data storage device comprises a solid state drive.

6. The method of claim 4, wherein the data store system further comprises a third data storage device, the third data storage device being faster at I/O operations than the first data storage device, but slower at I/O operations than the second data storage device.

7. The method of claim 6, wherein the identified storage container is de-staged from the first data storage device to the third data storage device, and subsequently de-staged from the third data storage device to the second data storage device.

8. The method of claim 1, wherein a first resiliency implementation is implemented in the first data storage device and a second, different resiliency implementation is implemented in the second data storage device within the data store system.

9. The method of claim 1, wherein identifying the storage container that is to be de-staged from the second data storage device to the first data storage device comprises determining which container was least recently written to.

10. The method of claim 1, wherein identifying the storage container that is to be de-staged from the second data storage device to the first data storage device comprises determining which container is full of data, such that the full container is de-staged from the second data storage device and moved to the first data storage device.

11. At a computer system including at least one processor, a computer-implemented method for efficiently storing data, the method comprising:
    accessing one or more portions of use information for a storage container stored on a first data storage device within a data store system that presents a plurality of data storage devices as a single logical data store, the storage container comprising a logical portion of the data store system that stores a plurality of data file portions corresponding to a plurality of data files;
    determining that the plurality of data file portions stored in the storage container includes data that has access characteristics that meet one or more criteria;
    based on the one or more criteria, determining that the storage container is to be moved from the first data storage device to a second, different, data storage device within the data store system;
    moving the storage container from the first data storage device to the second data storage device; and
    updating metadata for the storage container identifying its new location on the second data storage device, without updating metadata for the plurality of data files.

12. The method of claim 11, wherein at least one of the one or more criteria comprises an indication that the data has not been accessed for at least a threshold amount of time.

13. The method of claim 11, wherein the first data storage device comprises a solid-state drive (SSD), and wherein the second data storage device comprises a hard disk drive (HDD).

14. The method of claim 11, wherein the data store system includes one or more storage containers that are unmovable.

15. The method of claim 11, wherein one or more hidden storage containers are reserved on the second data storage device for repositioning containers.

16. The method of claim 11, wherein moving the storage container from the first data storage device to the second data storage device comprises compressing the data into a smaller-sized storage container.

17. A computer system comprising the following:
    one or more hardware processors; and
    one or more hardware storage devices having stored thereon computer-executable instructions that, when executed by the one or more processors, cause the computer system to perform at least the following:
       receiving a write request addressed to a first data storage device within a data store system that presents a plurality of data storage devices as a single logical data store;
       redirecting the received write request to a second storage device within the data store system, the second data storage device including one or more storage containers, each storage container comprising a logically specified portion of the data store system;
       determining which storage container the received write request is to write to on the second data storage device;
       identifying at least one storage container that is to be de-staged from the second data storage device to the first data storage device; and de-staging the identified storage containers to the first data storage device, wherein the data of the de-staged container is stored sequentially on the first data storage device.

18. The computer system of claim 17, wherein identifying at least one storage container that is to be de-staged from the second data storage device to the first data storage device comprises accessing a hint indicating which storage containers will not be used for a specified amount of time.

19. The computer system of claim 17, wherein the at least one identified storage container is de-staged to a sequentially-constrained media.

20. The computer system of claim 17, wherein the at least one storage container includes a plurality of data file portions corresponding to a plurality of different data files.

* * * * *